Patented Jan. 13, 1931

1,789,197

UNITED STATES PATENT OFFICE

SPERANZA SÉAILLES, NÉE CALOGÉROPOULOS, AND JEAN SÉAILLES, OF PARIS, FRANCE, ASSIGNORS, BY MESNE ASSIGNMENTS, TO ALFRED P. BOURQUARDEZ

CEMENT OBJECTS HAVING POLISHED AND TRANSLUCENT SURFACES

No Drawing. Application filed May 25, 1925, Serial No. 32,831, and in France May 30, 1924.

In our U. S. patent application Serial No. 686,928 filed on the 17th of January, 1924, which has become Patent No. 1,600,514, we set forth a process for the manufacture of objects in polished or half-polished cement.

The present invention relates to the application of the said process to certain aluminous cements for the obtainment of polished and translucent surfaces.

In accordance with the said invention, we utilize an aluminuous cement of a special nature, i. e. containing less than 1, 5 per cent of combined iron, and it is cast in molds in the pure state or mixed with suitable loading substances such as sand, gravel, asbestos, metal and the like, with or without coloring matter; said molds consist of glass or metal and are polished, coated or enameled in such manner as to form a smooth and polished surface. The cement mixture is optionally brought into the compact state by jarring or repeated shocks, settling, compression or like means, and it is then subjected to the setting process and the first hardening, in contact with the mold, for 12–18 hours.

We thus obtain a brilliant and polished surface, as is the case in known conditions with the usual aluminous cements, but our resulting product will further afford translucent properties which are not possessed by the products manufactured in the same conditions with the ordinary aluminous cements. With the special aluminous cements we may thus obtain products capable of entering into competition with the ceramic products having analogous translucent properties, and this represents a great progress in the manufacture in virtue of the simple and inexpensive production of the articles which are subjected to setting in the cold state, as compared with the ceramic baking processes.

We apply the terms special aluminous cements to the whole series of products ranging from the silico-aluminous compounds wherein the aluminates of lime preponderate, to the monocalcic, bicalcic and tricalcic aluminates, for instance, which are characterized by the fact that their index $$\frac{\text{silica} + \text{alumina}}{\text{lime} + \text{magnesia}}$$

is greater than 0,6, but wherein the proportion of iron is less than 1,5 per cent, whilst the normal almuinous cements contain a considerable amount of iron which is from 5 to 15 per cent as a rule.

We have further observed that aluminate of lime, $Al_2O_3 - CaO$ in a practically pure state, i. e. containing less than 5 per cent of impurities and less than 5 per cent, possesses superior qualities of translucency and hardness, will afford surfaces which are chiefly advantageous as concerns their use for facing or flooring purposes.

The translucent nature of the aluminous products according to the invention, in combination with the additionnal loading substances, will afford natural decorative effects of a widely varying character, due to the transparency of the surface grain of the material to which are added the known effects of decorative crystallization offered by the normal aluminous cements.

Another feature of my said products is their light color, such as light gray, light yellow, or white, which gives them a great value for decorative uses or for facings, in virtue of their luminous nature due to their light color and translucent character.

We may further color the said products by the addition of coloring matter, or may decorate them by coating the mold, before the casting, with fluid coloring matter optionally mixed with the said special cements which become incorporated with the coloring matter at the time of the setting, and the same may be disposed in decorations, designs or lettering, and the like. The coloring matter may also be used in the form of a dry powder; it may be sprinkled over with dry cement before the casting operation, in order to prevent all damage to the designs.

The special cements, and chiefly the monocalcic aluminate, may be used in a very thin layer to economize these expensive products, and may be covered with a suitable thickness of normal aluminous cement, or ordinary Portland cement, without being obliged to wait for the hardening or the setting of the first thin layer. In these conditions, in spite of the differences in the nature or the composition of the superposed layers, the whole arrangement will set together without any difficulty, and very economical results will be obtained in spite of the use of special products of a relatively expensive nature and even though authorities state that mixtures of different cements are to be avoided.

We may partially coat the mold with thin metal leaf such as gold leaf, or similar leaf consisting of copper, silver or other metals. The mold is then filled as before, and we thus combine the effect of the metal coated parts with the translucent effect of the substances, and the setting will result in a veritable petrifaction of the metal. The translucent part may also be colored or decorated, thus obtaining decorative effects of a remarkable and varied nature.

What we claim is:

1. As a new article of manufacture, a casting of aluminous cement containing less than 1.5% of iron and having a polished translucent surface.

2. As a new article of manufacture, a casting of aluminous cement mixed with coloring matter and containing less than 1.5% of iron and having a polished decorative translucent surface.

3. As a new article of manufacture, a casting of aluminous cement containing less than 1.5% of iron mixed with coloring matter and having a polished translucent surface partly overlaid with thin leaves of a metal.

4. As a new article of manufacture, a casting of aluminous cement whose index $$\frac{silica + alumina}{lime + magnesia}$$

is greater than 0.6 and which contains less than 1.5 percent of iron, said casting being characterized by a polished translucent surface.

In testimony whereof we have signed this specification.

SPERANZA SÉAILLES, née CALOGÉROPOULOS.

JEAN SÉAILLES.